United States Patent
Lin

(10) Patent No.: US 10,827,406 B2
(45) Date of Patent: Nov. 3, 2020

(54) METHOD OF CELL REDISTRIBUTION FOR USER EQUPMENT AND USER EQUIPMENT USING THE SAME

(71) Applicant: Acer Incorporated, New Taipei (TW)

(72) Inventor: Jung-Mao Lin, New Taipei (TW)

(73) Assignee: Acer Incorporated, New Taipei (TW)

( * ) Notice: Subject to any disclaimer, the term of this patent is extended or adjusted under 35 U.S.C. 154(b) by 14 days.

(21) Appl. No.: 16/378,569

(22) Filed: Apr. 9, 2019

(65) Prior Publication Data

US 2020/0029263 A1    Jan. 23, 2020

Related U.S. Application Data

(60) Provisional application No. 62/699,782, filed on Jul. 18, 2018.

(51) Int. Cl.
*H04W 36/08* (2009.01)
*H04W 48/20* (2009.01)
(Continued)

(52) U.S. Cl.
CPC .......... *H04W 36/08* (2013.01); *H04W 48/20* (2013.01); *H04W 68/005* (2013.01);
(Continued)

(58) Field of Classification Search
CPC ............... H04W 48/20; H04W 88/023; H04W 72/0453; H04W 68/005; H04W 76/27;
(Continued)

(56) References Cited

U.S. PATENT DOCUMENTS

| 9,008,659 B1 * | 4/2015 | Choi | H04W 36/04 370/331 |
| 2008/0254812 A1 * | 10/2008 | Kitazoe | H04W 28/08 455/456.2 |

(Continued)

FOREIGN PATENT DOCUMENTS

WO    2017018638    2/2017

OTHER PUBLICATIONS

Huawei, Hisilicon, "Support of Redistribution priority in NR", 3GPP TSG-RAN WG2 Meeting #98, R2-1704886, May 15-19, 2017, pp. 1-2.

(Continued)

*Primary Examiner* — Mark H Rinehart
*Assistant Examiner* — Kenneth P Hunt
(74) *Attorney, Agent, or Firm* — JCIPRNET

(57) ABSTRACT

The disclosure is directed to a method of cell redistribution for a UE and a UE using the same method. In one of the exemplary embodiments, the disclosure is directed to a method of cell redistribution for a UE. The method would include not limited to: acquiring an area information of a cell redistribution candidate for being redistributed from a camping cell to a target cell; performing a filtering procedure for the cell redistribution candidate based on the area information to determine a filtered cell redistribution candidate; performing a cell re-selection procedure to select the target cell from the filtered cell redistribution candidate; and attaching to the target cell.

18 Claims, 8 Drawing Sheets

(51) Int. Cl.
  *H04W 68/00* (2009.01)
  *H04W 72/04* (2009.01)
  *H04W 76/27* (2018.01)
  *H04W 88/02* (2009.01)

(52) U.S. Cl.
  CPC ....... *H04W 72/0453* (2013.01); *H04W 76/27* (2018.02); *H04W 88/023* (2013.01)

(58) Field of Classification Search
  CPC ................. H04W 36/08; H04W 48/12; H04W 36/00837; H04W 36/0094; H04W 36/22; H04W 28/0838; H04W 36/00835; H04W 36/0085; H04W 36/0088; H04W 36/164; H04W 28/0804; H04W 28/0808; H04W 28/0812; H04W 28/0815; H04W 28/0827; H04W 28/0835; H04W 36/0083–0094; H04W 36/16–20; H04W 36/24–32; H04W 36/34–385; H04W 28/08–0992; H04W 36/36
  See application file for complete search history.

(56) References Cited

U.S. PATENT DOCUMENTS

| | | | |
|---|---|---|---|
| 2012/0135730 A1* | 5/2012 | Rangaiah | H04W 48/20 455/434 |
| 2018/0035342 A1 | 2/2018 | Fujishiro et al. | |
| 2018/0098222 A1* | 4/2018 | Ku | H04W 16/08 |
| 2018/0132153 A1 | 5/2018 | Ku et al. | |
| 2018/0220330 A1* | 8/2018 | Van Der Velde | H04W 24/08 |
| 2018/0288666 A1* | 10/2018 | Fujishiro | H04W 36/22 |
| 2019/0313303 A1* | 10/2019 | Jung | H04W 48/20 |
| 2019/0349825 A1* | 11/2019 | Tseng | H04W 48/20 |

OTHER PUBLICATIONS

"Search Report of Europe Counterpart Application", dated Aug. 5, 2019, p1-p11.

Alcatel-Lucent et al., "A harmonised CRS solution for Idle mode load distribution", 3GPP TSG-RAN2#91 bis meeting, Oct. 5-9, 2015, pp. 1-3.

Huawei et al., "Cell reselection for inactive UEs", 3GPP TSG-RAN WG2 Meeting AH-1807, Jul. 2-6, 2018, pp. 1-3.

* cited by examiner

METHOD OF CELL REDISTRIBUTION FOR USER EQUPMENT AND USER EQUIPMENT USING THE SAME

CROSS REFERENCE TO RELATED APPLICATION

This application claims the priority benefit of U.S. provisional application Ser. No. 62/699,782, filed on Jul. 18, 2018. The entirety of the above-mentioned patent application is hereby incorporated by reference herein and made a part of specification.

TECHNICAL FIELD

The present disclosure is directed to a method of cell redistribution for a user equipment (UE) and a UE using the same method.

BACKGROUND

Currently, in a latest communication system, as a UE enters into a radio resource control (RRC) inactive state or into a power saving mode (e.g. idle mode, sleep mode, inactive mode, etc.), the UE could be redistributed from one cell to another. After the UE resumes the normal operation, the UE may operate under a cell that is different from the cell before the UE enters into the power saving mode. The redistribution of UEs from one cell to another is triggered by a network and may depend on different factors. As the UE is in a power saving mode, the UE would be triggered to perform a procedure so as to know whether to stay on the same cell or to attach to a new cell which is assigned by the network. For example, a UE may perform signal quality measurements of the cell which has been assigned by the network, when the UE is triggered to redistribute to the assigned cells. Otherwise, in normal operation, the UE may perform signal quality measurements by itself in order to detect available cells nearby. After the UE has a list of available cells that meets its signal quality standard, the UE may subsequently camp on the cell that has the highest frequency priority among cells that the UE has detected and have met the UE's signal quality standard.

If frequency priority is the only criteria to redistribute UE, it is possible for the UEs to be very unevenly distributed among different cells. FIG. 1 illustrates an example of a UE camping on a cell among cells that have different frequency priorities. In FIG. 1, cell_1 101 which operates under a first carrier frequency (F1) is considered to have higher frequency priority than cell_2 102 and cell_3 103 which operate under a second carrier frequency (F2). Even though cell_1 101, cell_2 102, and cell_3 103 all have satisfactory signal qualities for all the UEs, all the UEs would nevertheless choose to camp on cell_1 101 since cell_2 101 has the highest frequency priority. Consequently, cell_2 102 and cell_3 103 would be left empty.

In order to balance the distribution of UEs in a heterogeneous network (HetNet) with multiple carriers (e.g. F1 and F2 as shown in FIG. 1), the mechanism to redistribute UEs could be important so as to minimize the need for handovers that are triggered due to overloading of the cell or for redirecting network traffic of UEs after the UEs entering the RRC connected mode. The mechanism to redistribute a UE may need to take loadings of cells into consideration when the network decides to redistribute the UE. For example, if the loading status is assumed to be cell_3 103>cell_2 102>cell_1 101, then the quantity of UEs that are under a power saving mode would be cell_3 103<cell_2 102<cell_1 101.

FIG. 2 illustrates various criteria for redistributing UEs under a power saving mode among cells with different carrier frequencies. For a first scenario 201, the UEs under a power saving mode would be redistributed solely based on frequency priority (FP). Since cell_1 has a higher frequency priority than cell_2 and cell_3, then all UEs under a power saving mode are redistributed in cell_1. For a second scenario 202, there is an additional criterion which is to redistribute UEs based on cell specific priority (CSP). Assuming that some UEs are unable to be camp on cell_1, but could be redistributed to cell_2 and cell_3, then these UEs could all be redistributed to cell_2 if cell_2 has a higher CSP than cell_3. For a third scenario 203, there is an additional criterion which is to redistribute UEs based on UE's own determination. Some UEs that are unable to camp on cell_1 may also consider that cell_2 is undesirable. In such case, the remaining UEs may camp on cell_3.

To implementation the above described redistribution for a UE in a power saving mode, there could be two mechanisms. One mechanism is continuous randomization distribution (CRS) which redistributes UEs continuously. Another mechanism is one-shot re-distribution mechanism (OSS) which redistributes UEs in a power saving mode at once after the mechanism has been triggered by a paging message. FIG. 3 is a flow chart which illustrates some details of such implementation from the perspective of a UE. It is assumed that, for a UE in a power saving mode or in a RRC inactive state, there are five redistribution candidates including two frequency candidates and three cell candidates, and each cell corresponds to a different physical cell indicator (PCI). Thus, the frequency candidates are F1 and F2, and 3 cell candidates are PCI_1, PCI_2, and PCI_3. It is assumed that each of the frequency candidates is assigned with a redistribution factor which is shown in Table 1 below.

TABLE 1

| Redistribution Candidates | Redistribution Factor |
| --- | --- |
| F1 | 2 |
| F2 | 4 |
| PCI_1 | 4 |
| PCI_2 | 8 |
| PCI_3 | 2 |

Thus, while a UE is in a power saving mode, the UE may or may not be redistributed from one cell to all redistribution candidates. Such decision may depend on the UE's location. Therefore, the UE would need to perform the procedures of FIG. 3 in order to determine which cell the UE should camp on. Some details regarding the steps of FIG. 3 are provided as follows.

In step S301, a UE would obtain redistribution parameters which would include the contents of Table 1. In step S302, the UE would determine whether the redistribution mechanism is a CRS mechanism or OSS mechanism. If the redistribution mechanism is not the CRS mechanism, then the OSS mechanism could be assumed. In step S306, since the OSS mechanism is adopted and the redistribution is one shot only, the UE would perform a typical operation by receiving an indicator. In step S307, the UE would determine whether it has received a message having a redistribution indicator which indicates that a redistribution to another cell has occurred for the UE. If not, the UE would re-execute step S306. If so, the UE would perform step S303.

Assuming back in step S302 that the redistribution mechanism is the CRS mechanism, then in step S303, the UE would perform signal quality measurements for the redistribution parameters obtained from step S301. In step S304, the UE would determine whether any of the redistribution parameters are valid or has become valid. In detail, if at least one cell on the candidate frequency fulfills the cell selection criterion S (i.e. signal quality being satisfactory), the factor of the candidate frequency is valid. Also, if a candidate cell is ranked as the best cell on this candidate frequency, then the factor of the candidate cell is valid. For example, it is assumed that after a signal quality measurement, it has been determined that only the factor of F1, which is 2, and the factor of PCI_2, which is 8, are valid. Next, a ueID would be used to determine the redistribution target. A ueID is a value that is generated by a UE based on its identity (ID). If a ueID is within 0-20 range, then the redistribution target will be F1; otherwise, the redistribution target will be PCI_2. In step S305, once the redistribution target has been determined, then the UE will camp on the cell which corresponds to the determined redistribution target.

The above described redistribution mechanism may run into difficulties under the circumstance when a radio access network notification area update (RNAU) is to be triggered. An inter-frequency redistribution (i.e. redistribution of a UE across different cells or different carrier frequencies) may cause an unnecessary RNAU to occur for UEs that are in the RRC inactive state. A reason could be that a UE that is in RRC inactive may take a cell that out of its configured RAN Notification Area (RNA) as a redistribution target.

For example, FIG. 4 shows a scenario, within which, it is assumed that the RNA of UE_1 is cell_1 and cell_2, and the RNA of UE_2 is cell_2 and cell_3. When UE_1 and UE_2 both camp on cell_2, then the RNAU procedure would not be triggered since they are still within their configured radio access network (RAN) notification area. However, if cell_2 initiates the inter-frequency redistribution procedure to redistribute both UE_1 and UE_2, it is possible that the redistribution target of UE_1 is cell_3 and the redistribution target of UE_2 is cell_1. Under such circumstance, both UE_1 and UE_2 would trigger the RNAU.

However, since redistribution candidates are determined based on the current loading of a cell and statuses of the network, it is quite impossible to pre-configure all possible redistribution target candidates within an RNA for UEs that are in RRC inactive within the RNA. Therefore, a solution to reduce unnecessary RNAUs would be required at this time.

SUMMARY OF THE DISCLOSURE

Accordingly, the disclosure is directed to a method of cell redistribution for a UE and a UE using the same method In one of the exemplary embodiments, the disclosure is directed to a method of cell redistribution for a UE. The method would include not limited to: acquiring an area information of a cell redistribution candidate; performing a filtering procedure for the cell redistribution candidate based on the area information to determine a filtered cell redistribution candidate; and performing a cell re-selection procedure to select a target cell from the filtered cell redistribution candidate.

In one of the exemplary embodiments, the disclosure is directed to a user equipment which includes not limited to: a hardware transceiver; and a hardware processor coupled to the hardware transceiver and configured at least to: acquire, via the transceiver, a radio access area information of a cell redistribution candidate; perform a filtering procedure for the cell redistribution candidate based on the area information to determine a filtered cell redistribution candidate; perform a cell re-selection procedure to select a target cell from the filtered cell redistribution candidate.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also, the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
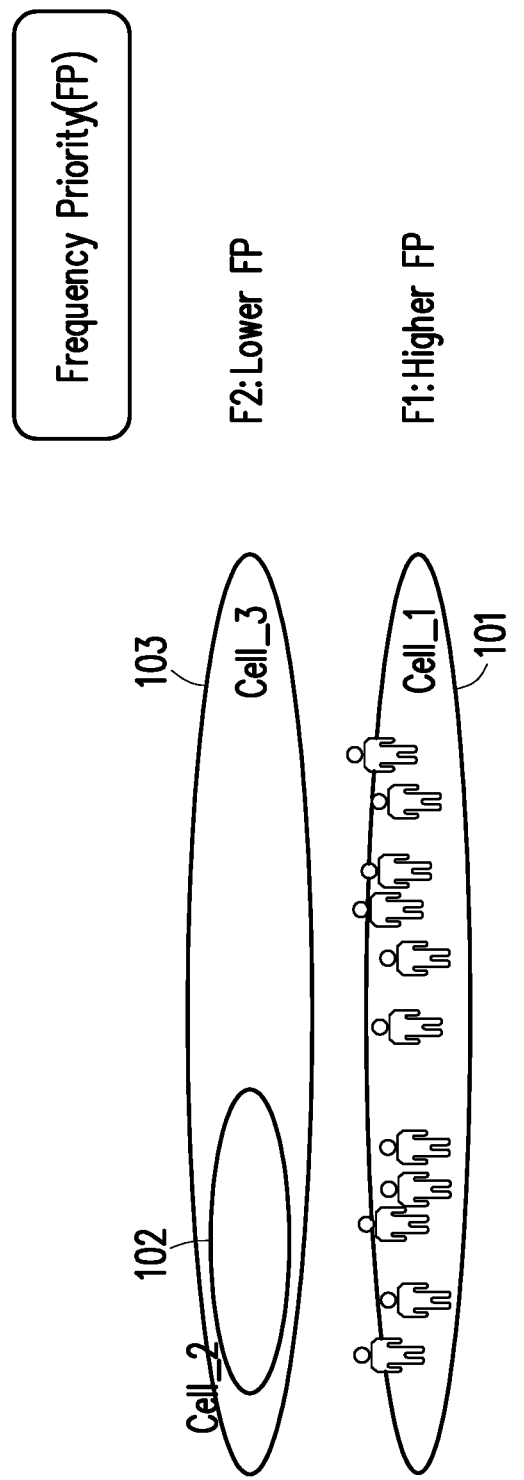
FIG. 1 illustrates an example of a UE camping on a cell among cells that have different frequency priorities of a current communication system.
Figure 2:
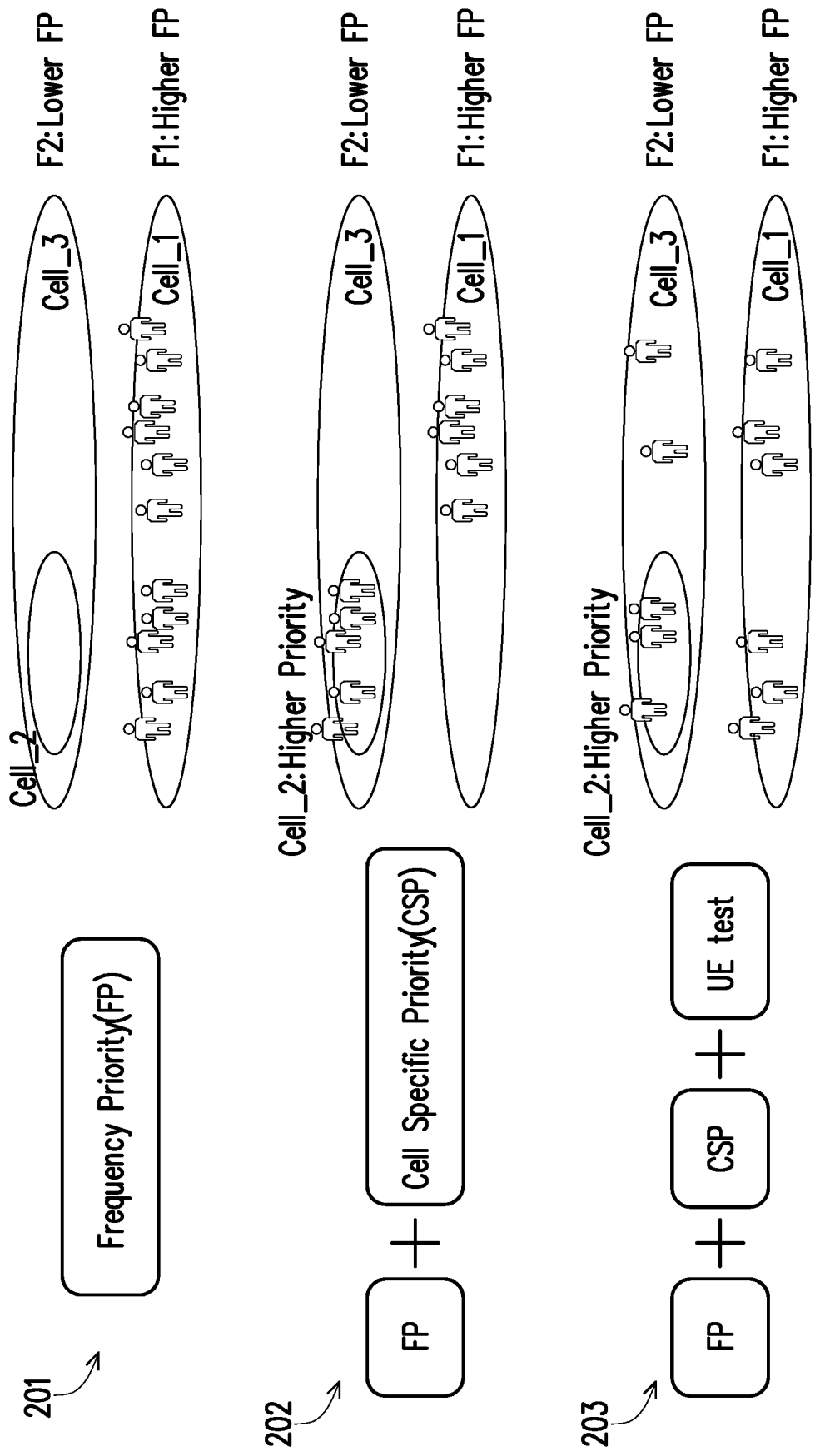
FIG. 2 illustrates various criteria for redistributing UEs under a power saving mode among cells with different carrier frequencies.

Reference will now be made in detail to the present exemplary embodiments of the disclosure, examples of which are illustrated in the accompanying drawings. Wherever possible, the same reference numbers are used in the drawings and the description to refer to the same or like parts.

As it was previously described, it is rather difficult and impractical for a network to pre-configure all possible redistribution candidates within an area (e.g. RNA) as the redistribution from one area to another for a UE which is in a power saving mode or is in the RRC inactive state are often based on instantaneous cell loadings, network statuses are so like. However, without careful configuration of redistribution candidates, unnecessary RNAU could be triggered even the UE is stable. Hence, a method of cell redistribution for a UE in idle mode or RRC inactive state is proposed to reduce unnecessary RNAUs. The method of cell redistribution would be used by a UE which would take the area information into consideration and perform a cell re-selection procedure accordingly.

Figure 5:
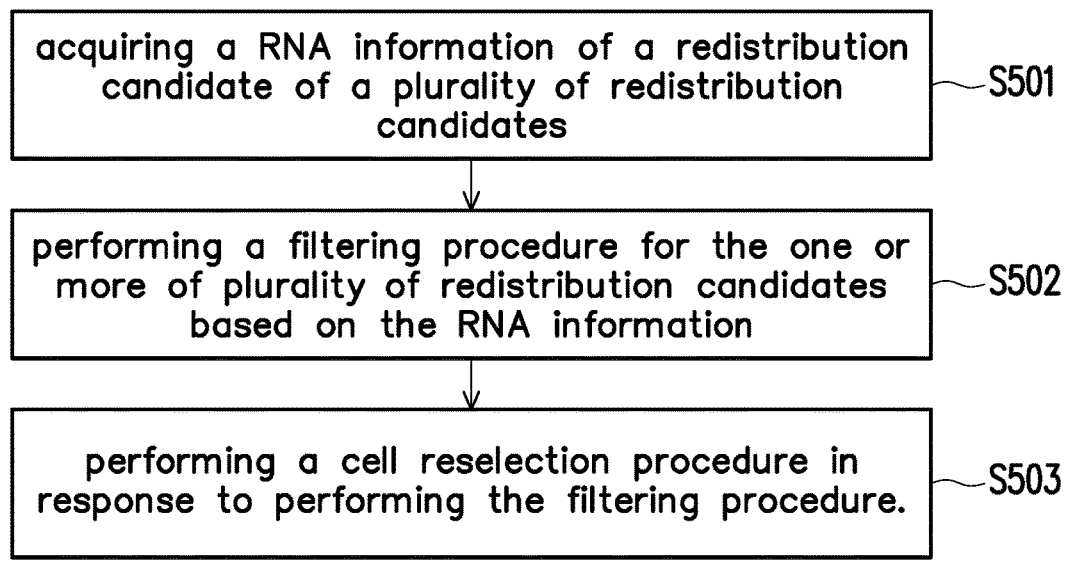
FIG. 5 illustrates a method of cell redistribution for a UE in according to one of the exemplary embodiments of the disclosure.

FIG. 5 is flow chart which illustrates a method of cell redistribution for a UE according to one of the exemplary embodiments of the disclosure. When a UE is in a power saving mode or a RRC inactive state, the UE would perform not limited to these following three steps. In step S501, the UE would acquire an area information such as a RNA information of one or more redistribution candidates from a plurality of redistribution candidates. In step S502, the UE would perform a filtering procedure for the one or more redistribution candidates based on the area information. In step S503, the UE would perform a cell reselection procedure in response to obtaining a result from the filtering procedure.

According one of exemplary embodiments, when the UE acquires area information of one or more redistribution candidates, the UE may obtain area information of the one or more redistribution candidates by following at least two options. In the first option, the UE could obtain area information of one or more redistribution candidates from a camping cell. The camping cell could be the cell from which the UE camps on and receives paging messages. Further, the above described area information of one or more redistribution candidates could be area information of all possible redistribution candidates known by the network or known by the UE. In the second option, the UE could obtain area information of one or more redistribution candidates from a measured cell. The measure cell could be a cell which satisfies the required signal quality (e.g. S criterion) after the UE performs a signal quality measurement on the cell. The RNA information of the one or more redistribution candidates may include area information of the measured cell.

According one of exemplary embodiments, the UE perform a filtering procedure for the one or more redistribution candidates based on the area information could be accomplished based on three options. In the first option, the UE may eliminate any redistribution candidate that outside of the area (e.g. outside of a RNA list). In the second option, the UE may consider the redistribution factor of any redistribution candidates within the area as a valid redistribution factor. In the third option, the UE may scale the redistribution parameter (e.g. redistribution factor or redistribution rage) of the redistribution candidate(s) within the area.

According one of exemplary embodiments, the UE may perform a cell reselection procedure in response to obtaining a result from the filtering procedure by selecting the one or more redistribution candidates within the area as having the highest priority for cell re-selection or by performing a normal cell re-selection procedure and ignoring the redistribution parameters.

Figure 6:
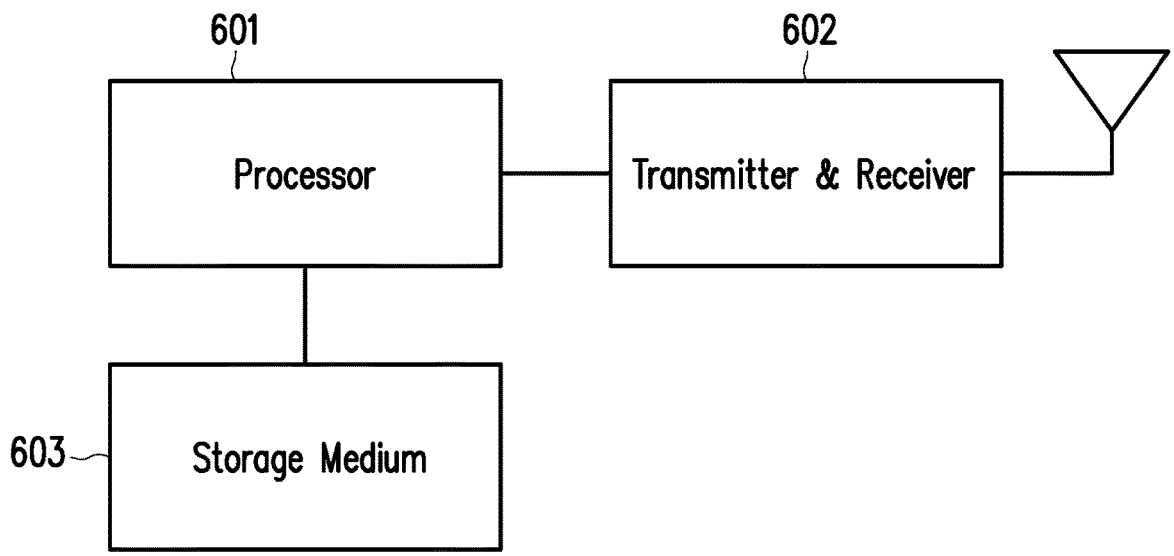
FIG. 6 is flow chart which illustrates the hardware block diagram of an exemplary UE according to one of the exemplary embodiments of the disclosure.

FIG. 6 illustrates the hardware block diagram of an exemplary UE according to one of the exemplary embodiments of the disclosure. The hardware of the UE would include not limited to a hardware processor 601, a hardware transceiver 602 which may include integrated or separate transmitter and receiver, and non-transitory storage medium 603. The hardware processor 601 is electrically connected to the hardware transceiver 602 and the non-transitory storage medium 603 and configured at least for implementing the provided method of cell redistribution and its exemplary embodiments.

The hardware transceiver 602 may include one or more transmitters and receivers configured to transmit and receive signals respectively in the radio frequency or in the mmWave frequency. The hardware transceiver 602 may also perform operations such as low noise amplifying, impedance matching, frequency mixing, up or down frequency conversion, filtering, amplifying, and so forth. The hardware transceiver 602 may each include one or more analog-to-digital (A/D) and digital-to-analog (D/A) converters which are configured to convert from an analog signal format to a digital signal format during uplink signal processing and from a digital signal format to an analog signal format during downlink signal processing. The hardware transceiver 602 may further include an antenna array which may include one or multiple antennas to transmit and receive omni-directional antenna beams or directional antenna beams.

The hardware processor 601 is configured to process digital signals and to perform procedures of the proposed hierarchical registration method in accordance with the proposed exemplary embodiments of the disclosure. Also, the hardware processor 401 may access to the non-transitory storage medium 603 which stores programming codes, codebook configurations, buffered data, and record configurations assigned by the hardware processor 601. The hardware processor 601 could be implemented by using programmable units such as a micro-processor, a micro-controller, a DSP chips, FPGA, etc. The functions of the hardware processor 601 may also be implemented with separate electronic devices or ICs. It should be noted that the functions of hardware processor 401 may be implemented with either hardware or software.

Figure 3:
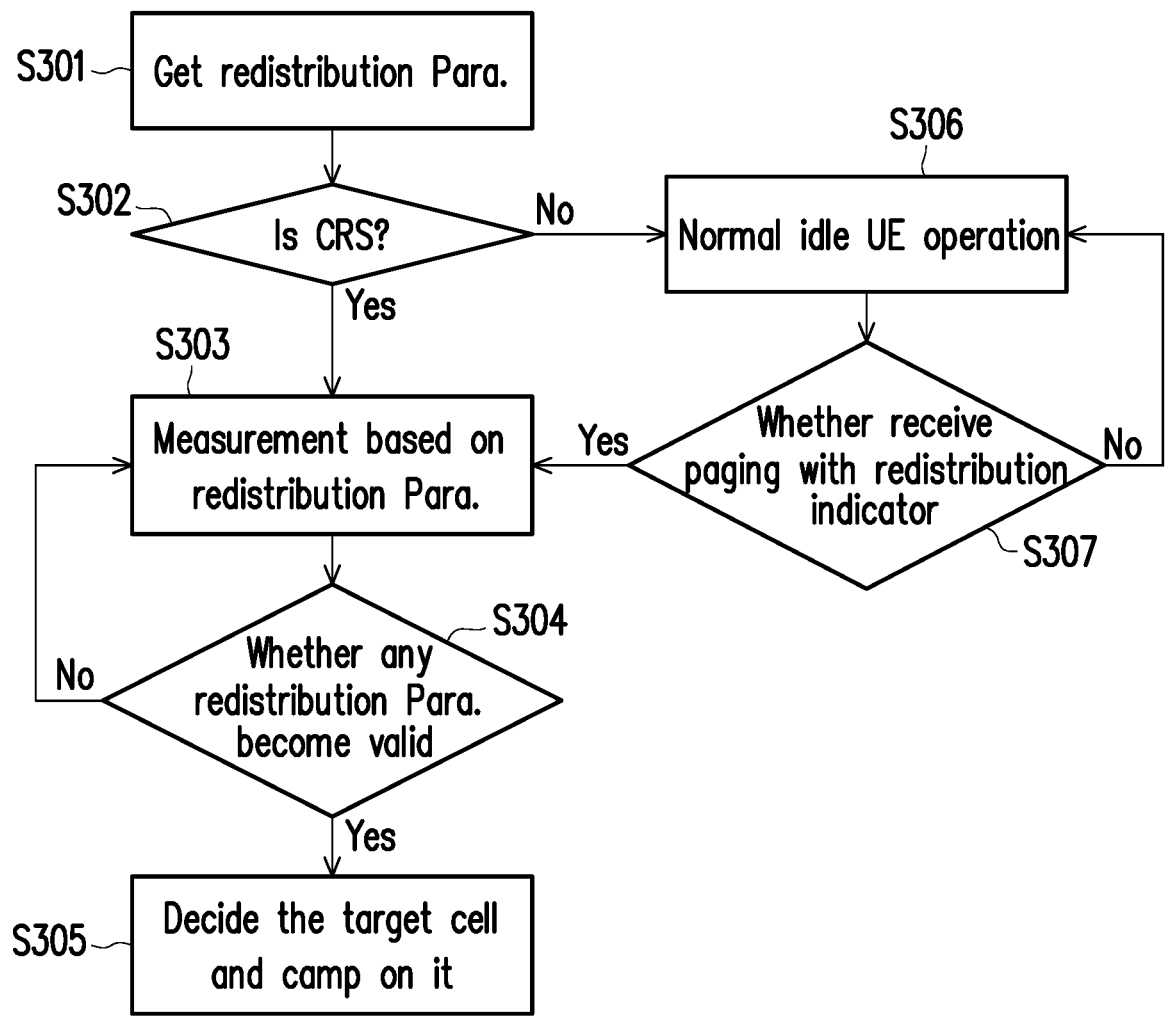
FIG. 3 is a flow chart which illustrates an implementation of redistributing UEs under a power saving mode among cells with different carrier frequencies.
Figure 4:
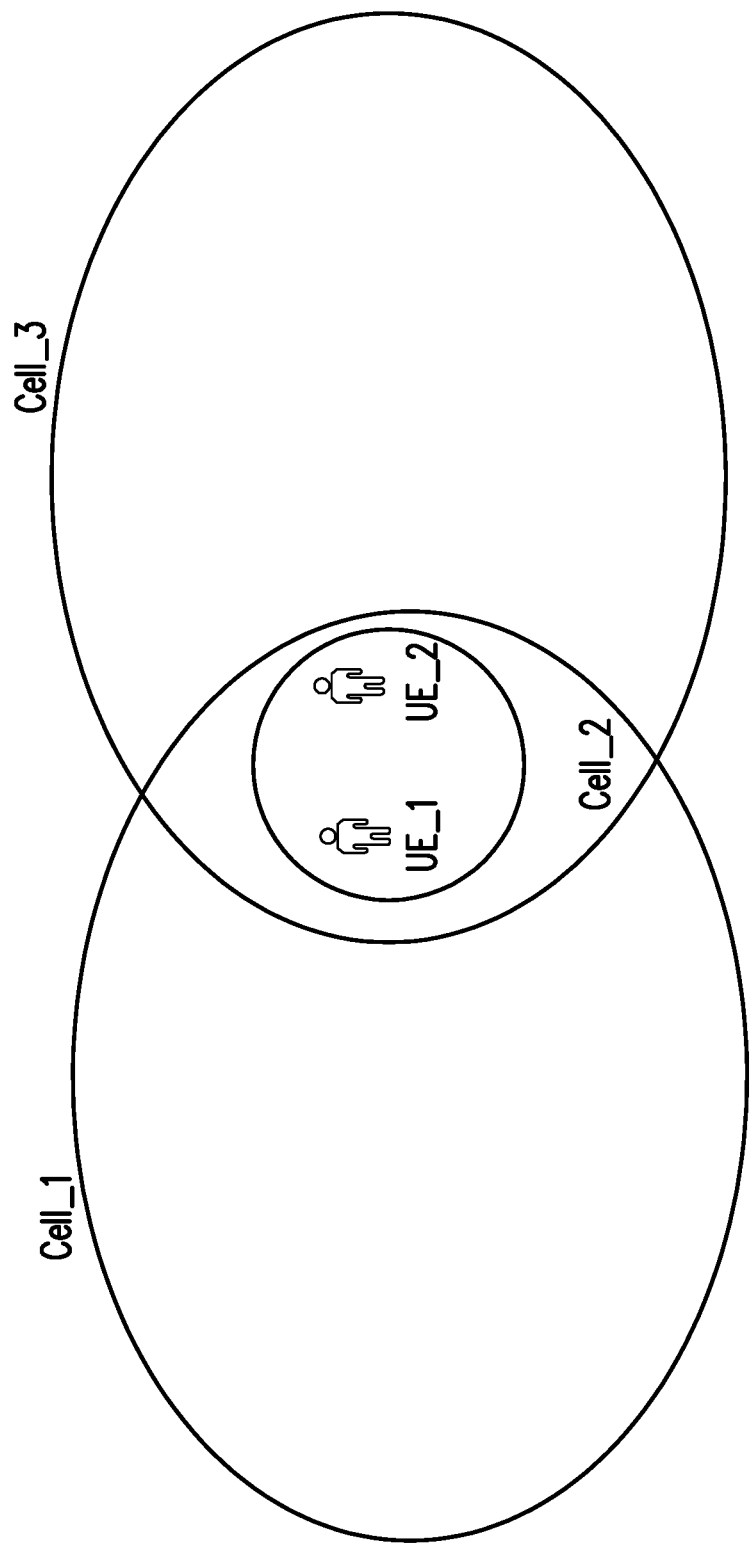
FIG. 4 illustrates an example of two UEs performing a current redistribution procedure moving from one cell to another.
Figure 7:
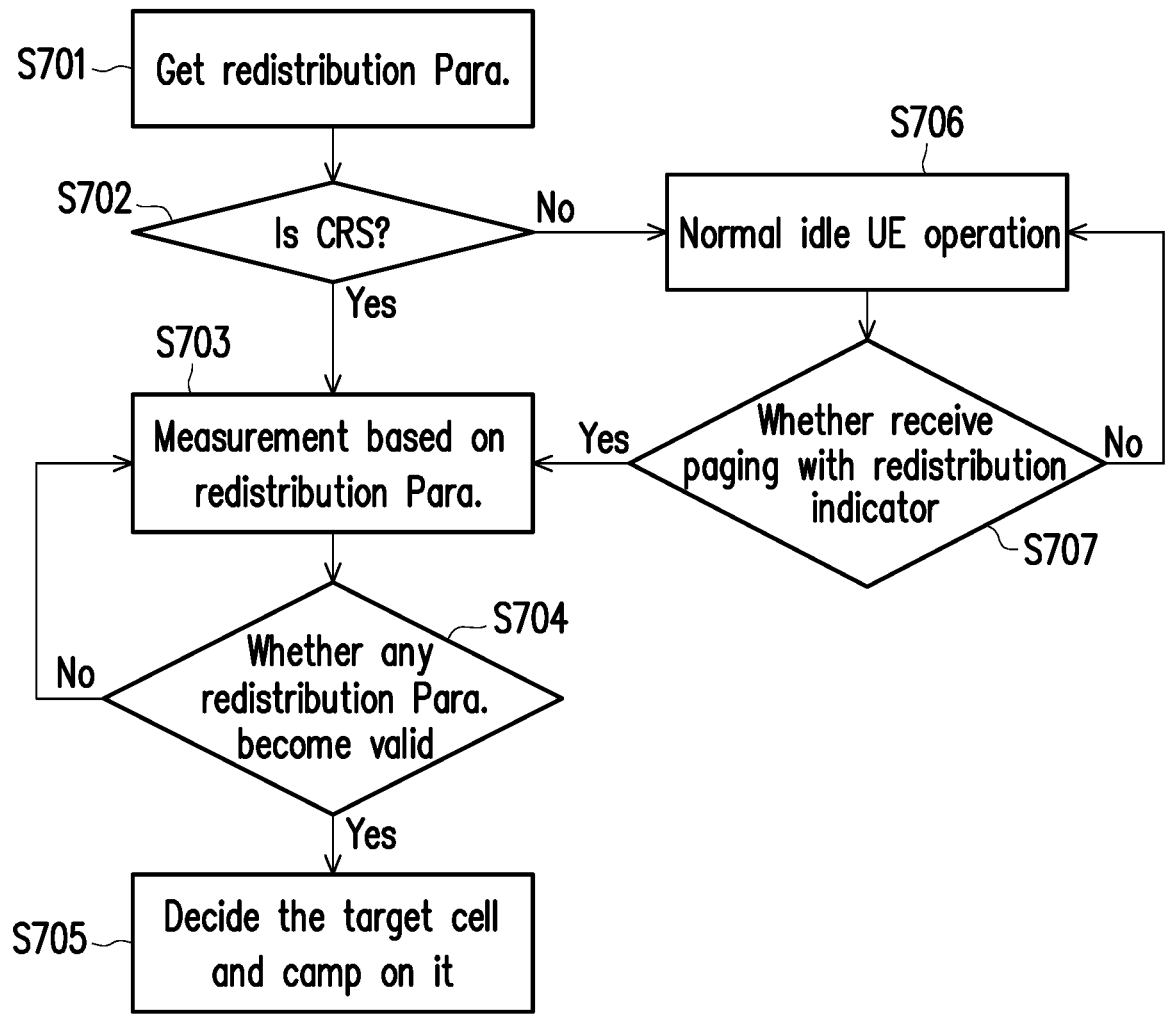
FIG. 7 is a flow chart which shows an improvement over the implementation of redistributing UEs under a power saving mode among cells with different carrier frequencies of FIG. 3 according to one of the exemplary embodiments of the disclosure.

FIG. 7 is a flow chart which shows an improvement over the implementation of redistributing UEs under a power saving mode among cells with different carrier frequencies of FIG. 3 according to one of the exemplary embodiments of the disclosure. In step S701, a UE would obtain redistribution parameters. In addition, the UE would also obtain an area information which is assumed to be an RNA information of one or more redistribution candidates. Alternatively, the UE may also obtain area information of all known redistribution candidates. In step S702, the UE would determine whether the redistribution mechanism is a CRS mechanism or OSS mechanism. If the redistribution mechanism is not the CRS mechanism, then the OSS mechanism could be assumed. In step S706, since the OSS mechanism is adopted and the redistribution is one shot only, the UE would perform a typical operation. In step S707, the UE would determine whether it has received a message having a redistribution indicator which would indicates that a redistribution to another cell has occurred for the UE. In addition, the redistribution indicator would further indicate whether to redistribute all UEs in an RRC inactive state or a percentage of UEs in the RRC inactive state. If not, the UE would re-execute step S706. If so, the UE would perform step S703.

Assuming back in step S702 that the redistribution mechanism is the CRS mechanism, then in step S703, the UE would perform signal quality measurements based on the redistribution parameters obtained from step S701. However, the UE that is in the RRC inactive state would only try to measure the redistribution candidate(s) which belong to its configured RNA. In step S704, the UE would determine whether any of the redistribution parameters are valid or has become valid. However, the condition for determining the whether any of the redistribution parameters are valid or has become valid could been modified from step S304 and will be explained in a latter part of the disclosure. In step S705, once the redistribution target has been determined, then the UE will camp on the cell which corresponds to the determined redistribution target. In addition, the redistribution candidates that are within the configured RNA of the UE could be scaled by a weight value. Each of the steps of FIG. 7 are to be elucidated with more details.

In step S701, a UE may obtain redistribution parameters and additionally RNA information of redistribution candidates from a cell or a base station such as a gNB. The RNA information may include not limited to cell identity, RNA code (RNAC), or tracking area identity list (TAI). For example, the gNB may provide the redistribution candidates with RNA information by a broadcast message or by dedicated signaling such as an RRC release message or a similar type of message. Thus, the RNA information for redistribution candidates could be, for example, similar to the information shown in Table 2 below.

| Redistribution candidate | Redistribution Factor | RNA Information |
|---|---|---|
| Frequency 1 | 5 | Cell identity list, RNAC list, or TAI of neighboring cells |
| PCI 1 | 8 | Cell identity, RNAC, or TAI |
| PCI 2 | 3 | Cell identity, RNAC, or TAI |

Figure 8:
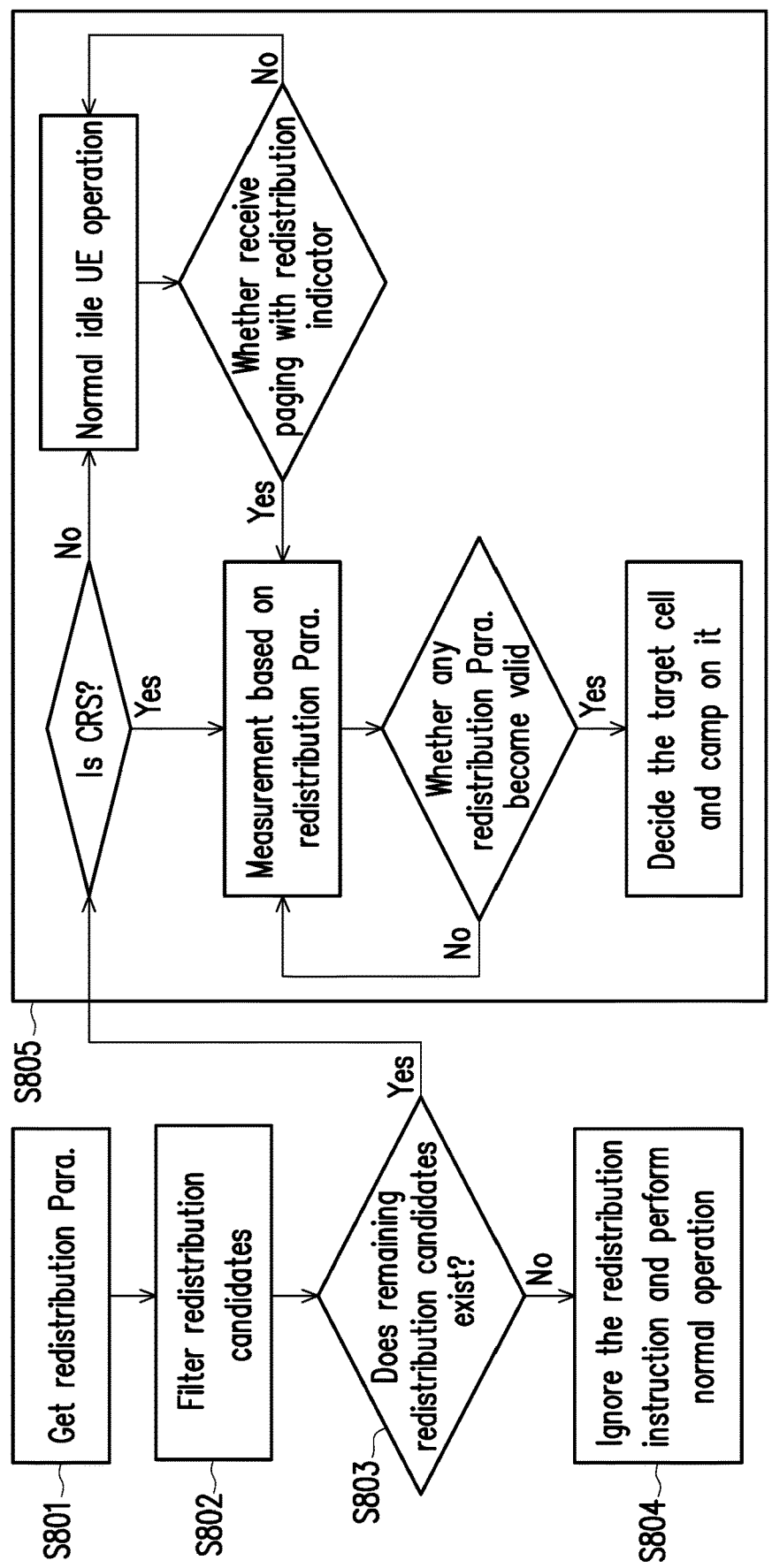
FIG. 8 illustrates one of the inventive concepts related to the method of cell redistribution for a UE according to one of the exemplary embodiments of the disclosure.

Step S702 is the same as step S302. In step S703, the UE would perform signal quality measurements based on the redistribution parameters obtained from step S701. However, the UE that is in the RRC inactive state would only try to measure the redistribution candidate(s) which belong to its configured RNA. The UE may do so by filtering out some of the redistribution candidates which do not belong to the UE's configured RNA. After the filtering, the UE would measure the remaining redistribution candidates and verify whether any redistribution parameters become valid. The remaining redistribution candidates would then be the redistribution candidates which belong to the UE's configured RNA. However, in the case that the UE not finding any remaining redistribution candidates, the UE should ignore the redistribution instruction. To implement the above described redistribution mechanism, FIG. 8 illustrates an exemplary embodiment of one such mechanism. Step S801 is the same as step S701, step S805 is the same as steps S702~S707, and steps S802~S804 are added to implement the above described redistribution mechanism. In step S802, the UE would filter out some of the redistribution candidates which do not belong to the UE's configured RNA. In step S803, the UE would determine whether there is any remaining redistribution candidate which below to the UE's configured RNA. If not, in step S804, the UE would ignore the redistribution instruction and perform the normal operation. If yes, the UE would execute step S805.

In step S704, the UE would determine whether any of the redistribution parameters are valid or has become valid. The condition for determining the whether any of the redistribution parameters are valid or has become valid has been redefined in comparison to step S304. In a known redistribution method, the valid condition of the redistribution parameter may include (1) If at least one cell on the candidate frequency fulfills the cell selection criterion S, the redistribution factor of the candidate frequency is valid; Or, (2) if a candidate cell is ranked as the best cell on this frequency, the redistribution factor of the candidate cell is valid. For inactive state UE, the valid condition of the redistribution parameter could be modified as: (1) If at least one cell on the candidate frequency fulfills the cell selection criterion S and the cell belongs to the configured RNA, the redistribution factor of the candidate frequency is valid; Or, (2) if a candidate cell ranked as the best cell on this frequency and belongs to the configured RNA, the redistribution factor of the candidate cell is valid. Thus, in order to verify whether a redistribution parameter of redistribution candidates is valid, the UE may need to acquire RNA information for the measured cell.

In step S705, once the redistribution target has been determined, then the UE will camp on the cell which corresponds to the determined redistribution target. In addition, the redistribution candidates that are within the configured RNA of the UE are be scaled by a weight value. In a known redistribution method, the valid redistribution parameters are normalized as redistrRange. For example, if the redistribution factor of F1, which is 2, and also redistribution factor of PCI_1, which is 8, are valid, then the redistrRange of F1 may be 100*(2/(2+8))=20, and the redistrRange of PCI_1 may be 100*(8/(2+8))=80. For a UE that is in a power saving mode or in the RRC inactive state, the redistrRange of the redistribution target which belongs to the configured RNA could be extended. For example, the redistribution factor of the redistribution target which belongs to the configured RNA could be added with an offset value or could be multiplied by a factor. For example, the redistrRange of the redistribution target which belongs to the configured RNA could be extended by multiplying a factor or by adding an offset value. The multiplying factor or the offset value could be configured by a network by a broadcast message or by a unicast message or by a dedicated signaling which could be, for example, an RRC release type of message.

In step S707, the UE would determine whether it has received a message having a redistribution indicator which would indicates that a redistribution to another cell has occurred for the UE. In addition, the redistribution indicator would further indicate whether to redistribute all UEs in an RRC inactive state or a percentage of UEs in the RRC inactive state. The redistribution indicator to be received from a paging message or from a broadcast message could contain more information. For example, redistribution indicator may further indicate that only UEs in a power saving mode or in a RRC inactive state would need to perform the method of cell redistribution. Alternatively, the redistribution indicator may indicate a portion of UEs that are in a power saving mode or in an RRC inactive state would need to be perform the method of cell redistribution. Further, only the UEs which are in a power saving mode or in an RRC inactive state and fulfill a condition of cell redistribution would need to perform the method of cell redistribution, and the condition of cell redistribution could be based on UE generated value and a redistribution UE range. For example, only the UEs which are in a power saving mode or in an RRC inactive state which generate values within the redistribution range would need to perform the method of cell redistribution.

To further elucidate the above described method of cell redistribution for a UE and the UE using the same method, the disclosure further provides several exemplary embodiments. The embodiments in this disclosure may be applied to any events disclosed. The process or the order of events/signaling/messages in the disclosure are not limited to these embodiments which serves to explain a piece of the overall inventive concepts. Also, steps, messages, and signaling described in the procedures may not be limited to the exactly order as described by the disclosure. It would be apparent to an ordinary person skilled in the art that each step or message or signaling may be inter-changeable and could be implemented in various combinations or may be implemented independently.

First Exemplary Embodiment

The concept of the first exemplary embodiment is the combination of step S701 and steps S802~S804. In the first exemplary embodiment, as described in step S701, a UE may obtain redistribution parameters which would include RNA information. The RNA information would include UE configured RNA and the RNA information for redistribution candidates that are provided by a camping cell. In step S802, a UE may filter the redistribution candidates which does not belong to the UE's configured RNA. UE could filter the redistribution candidates based on the UE configured RNA and the RNA information for redistribution candidates that are provided by a camping cell under which the UE camps on previously. After UE has filtered the redistribution candidates, in step S803, the UE would measure the remaining redistribution candidates to verify whether any redistribution parameters could be valid. The remaining redistribution candidates may be the redistribution candidates which belong to the UE's configured RNA. If UE does not find any valid redistribution candidates, in step S804, the UE would ignore the redistribution instruction.

Second Exemplary Embodiment

Figure 9:
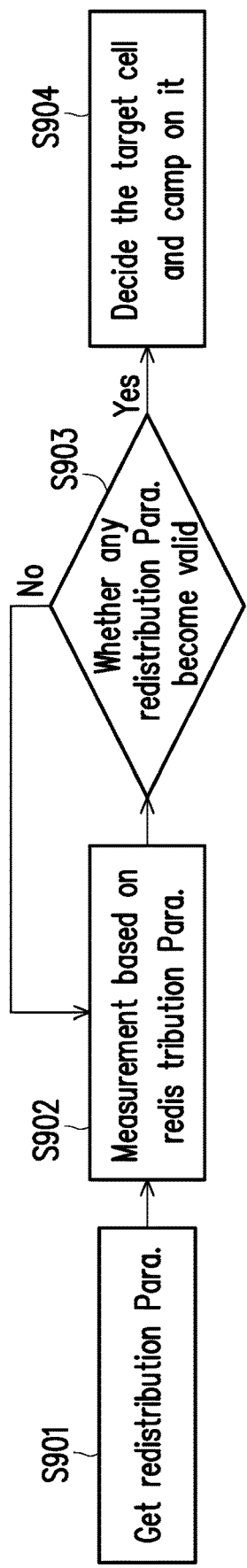
FIG. 9 illustrates an updated exemplary embodiment of the method of cell redistribution for a UE by expanding upon one of the exemplary embodiments of the disclosure.

The second exemplary embodiment expands upon the step S704 by modifying the valid condition. FIG. 9 shows an updated flow chart from FIG. 7. Step S901 could be the same as step S701 or step S801. In step S902, the UE would perform signal quality measurement based on redistribution parameters acquired from step S901. In order to verify whether the redistribution parameters of redistribution candidates are valid, the UE may need to acquire the RNA information for each cell to be measured, thus the UE would also need to have previously acquired the RNA information for the measured cell. The measured cell may be the cell which satisfies the signal quality (e.g., S criterion) after such measurement.

In step S904, for a UE in a power saving mode or in a RRC inactive state, the valid condition of the redistribution parameter may at least be that (1) if at least one cell on the candidate frequency fulfills the cell selection criterion S and the cell belongs to the configured RNA, then the redistribution factor of the candidate frequency is valid; or (2) if the candidate cell is ranked as the best cell on this frequency and belongs to the configured RNA, then the redistribution factor of the candidate cell is valid; or (3) if the candidate cell fulfills the cell selection criterion S and belongs to the configured RNA, then the redistribution factor of the candidate cell is valid. In step S904, once the redistribution factor of the candidate cell is target, the candidate cell becomes the target cell to be camped on; thus, the UE would camp on the target cell.

Third Exemplary Embodiment

For a UE which is in a power saving mode or in an RRC inactive state, the redistrRange of the redistribution target which belongs to configured RNA could be extended. The redistribution factor of the target which belongs to configured RNA could be added an offset value or multiplied a factor. For example, If the redistribution factor of F1, which is 1, and redistribution factor of PCI_1, which is 2, are valid, but only PCI_1 belongs to UE's configured RNA, then the UE may add an offset value x to the redistribution factor of PCI_1 so that the modified factor of PCI_1 will be 2+x. The UE will then use the modified factor of PCI_1 to calculate the corresponding redistrRange.

Alternative Third Exemplary Embodiment

For a UE which is in a power saving mode or in an RRC inactive state, the redistrRange of the redistribution target cell which belongs to UE's configured RNA could be extended. The redistrRange of the target cell which belongs to UE's configured RNA could be extended by multiplying a factor or by adding a offset value. For example, if redistrRange of F1 is 80 and redistrRange of PCI_1 is 20, but only PCI_1 belongs to UE's configured RNA, then the UE may multiply a value y to the redistrRange of PCI_1 and (1−y) to the redistrRange of F1. Thus, the modified redistrRange of PCI_1 will be 20*y and the modified redistrRange of F1 will be 80*(1−x). UE would then use the modified redistrRange to find the redistributed target cell.

Fourth Exemplary Embodiment

The redistribution indicator in a paging message or in a broadcast message could be modified to carry more information. For example, the redistribution indicator may further indicate that the UEs that are in a power saving mode or in an RRC inactive state would need to perform the method of cell redistribution. The existing paging message could be modified to contain a two-bits indicator. For example, 00 may mean that the method of cell redistribution is not triggered, 01 may mean that the method of cell redistribution is triggered for only any UE that is in a power saving mode, 10 may mean that the method of cell redistribution is triggered for any UE that is in an RRC inactive state, and 11 may mean that the method of cell redistribution is triggered for any UE that are both in a power saving mode and in a RRC inactive state.

The redistribution indicator may further be modified to indicate that a portion of UEs that are in a power saving mode or in an RRC inactive state would need to perform the method of cell redistribution. Thus, only UEs that are in a power saving mode or in an RRC inactive state may fulfill the condition of cell redistribution to perform the method of cell redistribution. The condition of cell redistribution could be based on a UE generated value and/or a redistribution UE range. For example, the paging message may contain a redistribution range for a UE which is in a power saving mode. Only when a value generated by a UE in a power saving mode falls within the redistribution UE range, the UE would need to perform the method of cell redistribution. The UE generated value could be a value that generated by a UE's identity.

In view of the aforementioned descriptions, the disclosure is suitable for being used in a wireless communication system and is able to redistribute UEs from one cell or another in a way that would reduce unnecessary RNAUs. Thus, the method of cell redistribution would be used by a UE which would take the RNA information into consideration and perform a cell re-selection procedure accordingly.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of cell redistribution used by a user equipment (UE), the method comprising:
   acquiring an area information of a cell redistribution candidate for being redistributed from a camping cell to a target cell;
   performing a filtering procedure for the cell redistribution candidate based on the area information to determine a filtered cell redistribution candidate; and
   performing a cell re-selection procedure to camp on the target cell from the filtered cell redistribution candidate,
   wherein performing the filtering procedure for the cell redistribution candidate based on the area information to determine the filtered cell redistribution candidate comprising:
   filtering out from any redistribute candidate that does not belong to an area as indicated by the area information by considering a redistribution factor of the any redistribute candidate that does not belong to the area as invalid; and
   determining the filtered cell redistribution candidate after filtering out any redistribute candidate that does not belong to the area.

2. The method of claim 1, wherein acquiring the area information of the cell redistribution candidate comprising:
   acquiring the area information of the cell redistribution candidate from the camping cell.

3. The method of claim 1, wherein acquiring the area information of the cell redistribution candidate comprising:
   performing a signal quality measurement of the cell redistribution candidate;
   determining the cell redistribution candidate to be a measured cell in response to a result of the signal quality measurement being satisfactory; and
   acquiring the area information of the cell redistribution candidate from the measured cell.

4. The method of claim 1, wherein performing the filtering procedure for the cell redistribution candidate based on the area information to determine the filtered cell redistribution candidate comprising:
   filtering out from the redistribute candidate any redistribute candidate that does not belong to an area as indicated by the area information; and
   determining the filtered cell redistribution candidate after filtering out any redistribute candidate that does not belong to the area.

5. The method of claim 1, wherein performing the filtering procedure for the cell redistribution candidate based on the area information to determine the filtered cell redistribution candidate further comprising:
   scaling a redistribution factor or a redistribution range of any cell redistribution candidate that belongs to the area as indicated by the area information.

6. The method of claim 1, wherein performing the cell re-selection procedure to select the target cell from the filtered cell redistribution candidate comprising:
   selecting the filtered cell redistribution candidate which belongs to a Radio Access Network Notification Area (RNA) as indicated by the area information as having a highest priority for to camp on the target cell.

7. The method of claim 5, further comprising:
   acquiring a redistribution parameter which comprises the area information of the cell redistribution candidate and the redistribution factor which corresponds to the cell redistribution candidate.

8. The method of claim 1, further comprising:
   receiving a paging message which comprise a redistribution indicator which indicates the UE to perform the method of cell redistribution when the UE is in a Radio Resource Control (RRC) inactive state.

9. The method of claim 1, wherein
   receiving a paging message which comprise a redistribution indicator which indicates the UE to perform the method of cell redistribution when the UE is in a power saving mode.

10. A UE comprising:
    a hardware transceiver; and
    a hardware processor coupled to the hardware transceiver and configured at least to:
    acquire, via the transceiver, an area information of a cell redistribution candidate for being redistributed from a camping cell to a target cell;
    perform a filtering procedure for the cell redistribution candidate based on a Radio Access Network Notification Area (RNA) information to determine a filtered cell redistribution candidate; and
    perform a cell re-selection procedure to camp on the target cell from the filtered cell redistribution candidate,
    wherein the hardware processor is configured to perform the filtering procedure for the cell redistribution candidate based on the area information to determine the filtered cell redistribution candidate comprising:
    filter out from any redistribute candidate that does not belong to an area as indicated by the area information by considering a redistribution factor of the any redistribute candidate that does not belong to the area as invalid; and
    determine the filtered cell redistribution candidate after filtering out any redistribute candidate that does not belong to the area.

11. The UE of claim 10, wherein the hardware processor is configured to acquire, via the transceiver, the area information of the cell redistribution candidate comprising:
acquire, via the transceiver, the area information of the cell redistribution candidate from the camping cell.

12. The UE of claim 10, wherein the hardware processor is configured to acquire the area information of the cell redistribution candidate comprising:
perform a signal quality measurement of the cell redistribution candidate;
determine the cell redistribution candidate to be a measured cell in response to a result of the signal quality measurement being satisfactory; and
acquire, via the transceiver, the area information of the cell redistribution candidate from the measured cell.

13. The UE of claim 10, wherein the hardware processor is configured to perform the filtering procedure for the cell redistribution candidate based on the area information to determine the filtered cell redistribution candidate comprising:
filter out from the redistribute candidate any redistribute candidate that does not belong to an area as indicated by the area information; and
determine the filtered cell redistribution candidate after filtering out any redistribute candidate that does not belong to the area.

14. The UE of claim 10, wherein the hardware processor is configured to perform the filtering procedure for the cell redistribution candidate based on the area information to determine the filtered cell redistribution candidate further comprising:
scale a redistribution factor or a redistribution range of any cell redistribution candidate that belongs to the area as indicated by the area information.

15. The UE of claim 10, wherein the hardware processor is configured to perform the cell re-selection procedure to select the target cell from the filtered cell redistribution candidate comprising:
select the filtered cell redistribution candidate which belongs to the area as indicated by the area information as having a highest priority for to camp on the target cell.

16. The UE of claim 14, wherein the hardware processor is further configured to:
acquire, via the transceiver, a redistribution parameter which comprises the area information of the cell redistribution candidate and the redistribution factor which corresponds to the cell redistribution candidate.

17. The UE of claim 10, wherein the hardware processor is further configured to:
receive, via the transceiver, a paging message which comprise a redistribution indicator which indicates UE to perform the method of cell redistribution when the UE is in a Radio Resource Control (RRC) inactive state.

18. The UE of claim 10, wherein the hardware processor is further configured to:
receive, via the transceiver, a paging message which comprise a redistribution indicator which indicates to the UE to perform the method of cell redistribution when the UE is in a power saving mode.

* * * * *